United States Patent
Wallack et al.

(10) Patent No.: US 11,077,557 B2
(45) Date of Patent: Aug. 3, 2021

(54) SYSTEM AND METHOD FOR ROBUST CALIBRATION BETWEEN A MACHINE VISION SYSTEM AND A ROBOT

(71) Applicant: COGNEX CORPORATION, Natick, MA (US)

(72) Inventors: Aaron S. Wallack, Natick, MA (US); Lifeng Liu, Arlington, MA (US); Xiangyun Ye, Framingham, MA (US)

(73) Assignee: COGNEX CORPORATION, Natick, MA (US)

( * ) Notice: Subject to any disclaimer, the term of this patent is extended or adjusted under 35 U.S.C. 154(b) by 203 days.

(21) Appl. No.: 16/192,233

(22) Filed: Nov. 15, 2018

(65) Prior Publication Data

US 2019/0084160 A1    Mar. 21, 2019

Related U.S. Application Data (62) Division of application No. 14/921,731, filed on Oct. 23, 2015, which is a division of application No. 12/780,119, filed on May 14, 2010, now Pat. No. 9,393,694.

(51) Int. Cl.
*G06K 9/00* (2006.01)
*B25J 9/16* (2006.01)
*G06T 7/80* (2017.01)

(52) U.S. Cl.
CPC ......... *B25J 9/1692* (2013.01); *B25J 9/1607* (2013.01); *B25J 9/1697* (2013.01); *G06T 7/80* (2017.01); *G05B 2219/39008* (2013.01); *G05B 2219/39022* (2013.01); *G05B 2219/39045* (2013.01); *G05B 2219/39057* (2013.01); *Y10S 901/09* (2013.01)

(58) Field of Classification Search
USPC .................................. 382/153, 154; 901/14
See application file for complete search history.

(56) References Cited

U.S. PATENT DOCUMENTS

| | | | |
|---|---|---|---|
| 4,831,549 A * | 5/1989 | Red | G05B 19/4182 700/254 |
| 4,881,249 A | 11/1989 | Chautemps et al. | |
| 5,297,238 A | 3/1994 | Wang et al. | |
| 5,742,037 A | 4/1998 | Scola et al. | |
| 5,859,924 A | 1/1999 | Liu et al. | |

(Continued)

FOREIGN PATENT DOCUMENTS

| EP | 0265302 A1 | 4/1988 |
|---|---|---|
| EP | 0963816 A2 | 12/1999 |

(Continued)

OTHER PUBLICATIONS

Daniilidis, Hand-Eye Calibration Using Dual Quaternions, International Journal of Robotics Research, 1999, 18 (3):286-298.

(Continued)

*Primary Examiner* — Kathleen Y Dulaney
(74) *Attorney, Agent, or Firm* — Quarles & Brady LLP (57) ABSTRACT

A system and method for robustly calibrating a vision system and a robot is provided. The system and method enables a plurality of cameras to be calibrated into a robot base coordinate system to enable a machine vision/robot control system to accurately identify the location of objects of interest within robot base coordinates.

13 Claims, 5 Drawing Sheets

(56) References Cited

U.S. PATENT DOCUMENTS

| | | | |
|---|---|---|---|
| 5,918,196 A | 6/1999 | Jacobson | |
| 5,960,125 A | 9/1999 | Michael et al. | |
| 5,978,080 A | 11/1999 | Michael et al. | |
| 5,978,502 A | 11/1999 | Ohashi | |
| 5,978,521 A | 11/1999 | Wallack et al. | |
| 6,005,965 A | 12/1999 | Tsuda et al. | |
| 6,026,172 A | 2/2000 | Lewis, Jr. et al. | |
| 6,070,109 A * | 5/2000 | McGee | B25J 9/1692 |
| | | | 700/254 |
| 6,101,455 A | 8/2000 | Davis | |
| 6,137,893 A | 10/2000 | Michael et al. | |
| 6,166,811 A | 12/2000 | Long et al. | |
| 6,301,396 B1 | 10/2001 | Michael et al. | |
| 6,317,991 B1 | 11/2001 | Rinn | |
| 6,357,588 B1 | 3/2002 | Room et al. | |
| 6,539,107 B1 | 3/2003 | Michael et al. | |
| 6,594,623 B1 | 7/2003 | Wang et al. | |
| 6,618,633 B1 | 9/2003 | Gooch et al. | |
| 6,624,899 B1 | 9/2003 | Clark | |
| 6,639,624 B1 | 10/2003 | Bachelder et al. | |
| 6,658,145 B1 | 12/2003 | Silver et al. | |
| 6,681,151 B1 | 1/2004 | Weinzimmer et al. | |
| 6,718,074 B1 | 4/2004 | Dutta-Choudhury et al. | |
| 6,724,922 B1 | 4/2004 | Vilsmeier | |
| 6,728,582 B1 | 4/2004 | Wallack | |
| 6,748,104 B1 | 6/2004 | Bachelder et al. | |
| 6,751,338 B1 | 6/2004 | Wallack | |
| 6,751,361 B1 | 6/2004 | Wagman | |
| 6,768,509 B1 | 7/2004 | Bradski et al. | |
| 6,771,808 B1 | 8/2004 | Wallack | |
| 6,798,925 B1 | 9/2004 | Wagman | |
| 6,816,187 B1 | 11/2004 | Iwai et al. | |
| 6,822,748 B2 | 11/2004 | Johnston et al. | |
| 6,850,646 B1 | 2/2005 | Silver et al. | |
| 6,856,698 B1 | 2/2005 | Silver et al. | |
| 6,993,177 B1 | 1/2006 | Bachelder | |
| 7,019,825 B2 | 3/2006 | Roh et al. | |
| 7,023,473 B2 | 4/2006 | Iwai et al. | |
| 7,085,622 B2 | 8/2006 | Sadighi et al. | |
| 7,200,260 B1 * | 4/2007 | Watanabe | B25J 9/1692 |
| | | | 382/103 |
| 7,212,228 B2 | 5/2007 | Utsumi et al. | |
| 7,292,257 B2 | 11/2007 | Kang et al. | |
| 7,356,425 B2 | 4/2008 | Krahnstoever et al. | |
| 7,359,817 B2 | 4/2008 | Ban et al. | |
| 7,360,410 B2 | 4/2008 | Steinbichler et al. | |
| 7,373,270 B2 | 5/2008 | Ohashi et al. | |
| 7,414,732 B2 | 8/2008 | Maidhof et al. | |
| 7,609,893 B2 | 10/2009 | Luo et al. | |
| 7,680,323 B1 | 3/2010 | Nichani | |
| 7,777,300 B2 | 8/2010 | Tews et al. | |
| 7,899,577 B2 * | 3/2011 | Ban | B25J 9/1692 |
| | | | 700/245 |
| 8,208,716 B2 | 6/2012 | Choi et al. | |
| 8,743,214 B2 | 6/2014 | Grossmann et al. | |
| 9,393,694 B2 | 7/2016 | Wallack et al. | |
| 9,507,995 B2 | 11/2016 | Konolige et al. | |
| 2002/0167726 A1 | 11/2002 | Barman et al. | |
| 2003/0091227 A1 | 5/2003 | Chang et al. | |
| 2004/0102911 A1 | 5/2004 | Roh et al. | |
| 2004/0104935 A1 * | 6/2004 | Williamson | G06T 15/20 |
| | | | 715/757 |
| 2004/0172164 A1 | 9/2004 | Habibi et al. | |
| 2004/0220767 A1 | 11/2004 | Tanaka et al. | |
| 2004/0234118 A1 | 11/2004 | Astrom et al. | |
| 2005/0089214 A1 | 4/2005 | Rubbert et al. | |
| 2005/0107920 A1 | 5/2005 | Ban et al. | |
| 2005/0159842 A1 * | 7/2005 | Ban | B25J 19/023 |
| | | | 700/245 |
| 2005/0162420 A1 | 7/2005 | Ban et al. | |
| 2006/0181236 A1 | 8/2006 | Brogardh | |
| 2006/0215813 A1 | 9/2006 | Scherch et al. | |
| 2006/0229766 A1 | 10/2006 | Setsuda | |
| 2006/0232583 A1 | 10/2006 | Petrov et al. | |
| 2007/0075997 A1 | 4/2007 | Rohaly et al. | |
| 2007/0081714 A1 | 4/2007 | Wallack et al. | |
| 2007/0127774 A1 | 6/2007 | Zhang et al. | |
| 2007/0229665 A1 | 10/2007 | Tobiason et al. | |
| 2008/0004750 A1 * | 1/2008 | Ban | B25J 9/1692 |
| | | | 700/245 |
| 2008/0012850 A1 | 1/2008 | Keating, III | |
| 2008/0129894 A1 | 6/2008 | Kang et al. | |
| 2008/0188983 A1 * | 8/2008 | Ban | G01B 21/042 |
| | | | 700/245 |
| 2008/0228422 A1 | 9/2008 | Satoh | |
| 2009/0060280 A1 | 3/2009 | Choi et al. | |
| 2009/0299688 A1 | 12/2009 | Kohler | |
| 2010/0020178 A1 | 1/2010 | Kleihorst | |
| 2010/0079598 A1 | 4/2010 | Ke et al. | |
| 2010/0134634 A1 | 6/2010 | Witt | |
| 2010/0166294 A1 | 7/2010 | Marrion et al. | |
| 2011/0046782 A1 | 2/2011 | Fixell | |
| 2011/0157373 A1 | 6/2011 | Ye et al. | |
| 2014/0229005 A1 * | 8/2014 | Suzuki | B25J 9/1697 |
| | | | 700/254 |

FOREIGN PATENT DOCUMENTS

| | | |
|---|---|---|
| EP | 2070664 A1 | 6/2009 |
| FR | 2598019 A1 | 10/1987 |
| JP | H08201021 A | 8/1996 |
| JP | 10080882 A | 3/1998 |
| JP | 2004239747 A | 8/2004 |
| JP | 2004288976 A | 10/2004 |
| JP | 2004354257 A | 12/2004 |
| JP | 2006110705 A | 4/2006 |
| WO | 9511491 A1 | 4/1995 |
| WO | 0180764 A2 | 11/2001 |
| WO | 2004011876 A1 | 2/2004 |
| WO | 2008147355 A1 | 12/2008 |

OTHER PUBLICATIONS

Faugeras, et al., The Representation, Recognition, and Locating of 3-D Objects, International Journal of Robotics Research, 1986, 5(3):27-52.

Lavallee, et al., Recovering the Position and Orientation of Free-Form Objects from Image Contours Using 3D Distance Maps, IEEE Transactions on Pattern Analysis and Machine Intelligence, 1995, 17(4):378-390.

Lepetit, et al., Point Matching as a Classification Problem for Fast and Robust Object Pose Estimation, In Proceedings of the 2004 IEEE Computer Society Conference on Computer Vision and Pattern Recognition, 2004, CVPR 2004, vol. 2, 7 pages.

Schmidt, et al., Robust Hand-Eye Calibration of an Endoscopic Surgery Robot Using Dual Quaternions, Pattern Recognition, Proceedings of the 25th DAGM Symposium, Magdeburg, Germany, Sep. 2003, pp. 548-556.

Schmidt, et al., Vector Quantization Based Data Selection for Hand-Eye Calibration, VMV, 2004, Stanford, USA, Nov. 16-18, 2004, 8 pages.

Stein, et al., Monitoring Activities from Multiple Video Streams: Establishing a Common Coordinate Frame, Massachusetts Institute of Technology Artificial Intelligence Laboratory, A.I. Memo No. 1655, Apr. 1999, 23 pages.

Strobl, et al., Optimal Hand-Eye Calibration, Proceedings of the 2006 IEEE/RSJ International Conference on Intelligent Robots and Systems, Oct. 9-15, 2006, Beijing, China, pp. 4647-4653.

Tsai, A Versatile Camera Calibration Technique for High-Accuracy 3D Machine Vision Metrology Using Off-the-Shelf TV Cameras and Lenses, IEEE Journal of Robotics and Automation, 1987, RA-3(4):323-344.

Tsai, et al., A New Technique for Fully Autonomous and Efficient 3D Robotics Hand/Eye Calibration, IEEE Transactions on Robotics and Automation, 1989, 5(3):345-358.

Wunsch, et al., Registration of CAD-Models to Images by Iterative Inverse Perspective Matching, In Proceedings of 13th International Conference on Pattern Recognition, IEEE, 1996, vol. 1, pp. 78-83.

(56) References Cited

OTHER PUBLICATIONS

Wunsch, et al., Real-Time Pose Estimation of 3-D Objects from Camera Images Using Neural Networks, Proceedings of the 1997 IEEE International Conference on Robotics and Automation, 1997, vol. 4, pp. 3232-3237.
Zhang, A Flexible New Technique for Camera Calibration, Technical Report MSR-TR-98-71, Microsoft Research, Microsoft Corporation, 1998, 22 pages.
PCT International Search Report and Written Opinion, PCT/US2011/036460, dated Jun. 22, 2012, 22 pages.

\* cited by examiner

FIG. 5

SYSTEM AND METHOD FOR ROBUST CALIBRATION BETWEEN A MACHINE VISION SYSTEM AND A ROBOT

CROSS-REFERENCE TO RELATED APPLICATIONS

This divisional application claims priority to U.S. patent application Ser. No. 14/921,731 filed Oct. 23, 2015, which is a divisional of U.S. patent application Ser. No. 12/780,119, filed May 14, 2010, now U.S. Pat. No. 9,393,694 issued Jul. 19, 2016, both of which are incorporated herein by reference.

FIELD OF THE INVENTION

Illustrative embodiment of the present invention relate to calibrating a machine vision system and, more particularly, to a system and method for calibration between a machine vision system and a robot.

BACKGROUND OF THE INVENTION

Articulated arms are controllable machines that can accurately and repeatably move an end effector throughout a workspace to a specified pose. As used herein, the term pose illustratively refers to a combination of three dimensional position and three dimensional rotation. A robot pose illustratively corresponds to the pose of the end effector in terms of the robot's coordinate system. Illustratively, end effectors are controllable machines that are capable of grasping and releasing workpieces and may comprise, e.g., mechanical grippers, vacuum suction, electromagnetic contacts, etc. Generally, as used herein, the combination of an articulated arm and an end effector is termed a robot. The three dimensional area that is accessible by the robot for performing operations is termed a workplace for the robot. Robots are illustratively utilized to perform tasks such as moving a workpiece within the workspace by performing a predetermined sequence of steps. For example, the end effector may be moved along trajectory T1 to end effector pose P1. The end effector may then grasp a workpiece before moving along trajectory T2 to end effector pose P2. Once at pose P2, the end effector may then release the workpiece. A known disadvantage of utilizing such robots is that the workpiece must be presented at a known pose in order for the robot to successfully perform the task. For example, the end effector may fail to grasp the workpiece if the workpiece is not initially located at the expected pose. Workpiece pose inaccuracy is a well-known noted disadvantage of such robot systems and is a typical reason that robots are not selected for use in performing pick, place, and assembly operations.

One known technique to eliminate workpiece pose inaccuracy is to utilize sensors to first measure the workpiece pose and then to utilize that measured workpiece pose to adjust the robot's trajectories. Machine vision is a typical technique utilized to sense workpiece positions as machine vision is typically a fast, inexpensive, non-contact sensing modality. The term Vision Guided Robotics (VGR) illustratively refers to the process of using a machine vision system to help the robot perform tasks.

A noted disadvantage of using machine vision to measure a workpiece's pose is that the machine vision system typically measures the workpiece pose with respect to the machine vision system's coordinate system, whereas the robot moves the end effector with respect to the robot's coordinate system. Thus, the workpiece pose computed by the machine vision system must be translated into the robot's coordinate system in order for the robot to make use of the workpiece pose computed by the machine vision system. The term hand-eye calibration illustratively refers to the task of determining the relationship between the machine vision system's coordinate system and the robot's coordinate system.

As will be appreciated by those skilled in the art, the accuracy of the hand-eye calibration directly affects the accuracy of the VGR procedures. If the hand-eye calibration accurately reflects the true relationship between the machine vision system's coordinate system and the robot's coordinate system, then accurate machine vision measurements of the workpiece pose will induce accurate end effector poses for picking, placing, and assembling the workpiece. Correspondingly, if the hand-eye calibration is inaccurate and does not reflect the true relationship between the machine vision system's coordinate system and the robot's coordinate system, then accurate machine vision measurement of the workpiece will not necessarily induce accurate end effector poses for picking, placing, and assembling the workpiece. These inaccurate robot poses may result in the robot failing to perform the intended tasks.

Tsai and Lenz developed a well-known technique for performing hand-eye calibration. Their technique is described in "A new technique for fully autonomous and efficient 3D robotics hand/eye calibration", IEEE Transactions on Robotics Automation, Volume 5, Issue 3, pages 345-348, the contents of which are hereby incorporated by reference. Tsai and Lenz's technique illustratively obtains a set of robot poses and associated acquired images. For each of the acquired images, the technique estimates the pose of the camera with respect to the calibration object. This produces a set of robot poses and estimated poses of the camera with respect to the calibration object. Tsai and Lenz's technique then determines the pose of the camera with respect to the articulated arm from the set of robot poses and corresponding estimated camera poses. In an exemplary case of a stationary camera environment, a noted disadvantage of Tsai and Lenz's technique is that it does not explicitly incorporate the constraint that there is one and only one pose of the camera with respect to the robot base and that there is one and only one pose of the calibration object with respect to the end effector. Instead, Tsai and Lenz's technique allows for independent, therefore possibly inconsistent, estimates of the camera poses and further allows for independent, therefore possibly inconsistent, estimates of the calibration object poses.

A further noted disadvantage of Tsai and Lenz's technique is that it only performs calibration for a single camera in a machine vision system at a time. Thus, if it is desired to perform calibration for a plurality of cameras in a machine vision system, the Tsai and Lenz technique must be performed repeatedly for each of the cameras. This increases the time required to perform calibration and allows for independent and therefore possibly inconsistent calibration for individual cameras.

Tsai and Lenz considered pairwise motions and considered the expression $A_iX=XB_i$ where $A_i$ characterizes the perceived motion of the camera and $B_i$ characterizes a relative motion of the end effector. Thereby, they could compute the transform between the end effector and the camera X by solving for the X which minimized the overall discrepancies between pairs of $AX_i$ and $XB_i$. In "Optimal Hand-Eye Calibration", published in the Proceedings of the 2006 IEEE/RSJ International Conference on Intelligent Robots and Systems, 2008 pages 4647-4653, Strobl and Hirzinger mentioned a hand-eye calibration technique which considered the expression AX=ZB to estimate the end-effector-camera transform and the robot-calibration plate transforms, the problem is reduced to a system of rigid transforms: AiX=ZBi, where Ai characterizes the perceived transform between the camera and the calibration plate, X characterizes the end effector-camera transform, Z characterizes the robot base-calibration plate transform, and Bi characterizes the end effector pose (the transform from the end effector to the robot base). The drawback of both of these approaches (and all other approaches following the basic technique) is that they involve estimating differences between two rigid transforms: diff(Transform1,Transforms2), and there is no well-understood, physically-meaningful way of measuring the difference between two transforms.

Another drawback of methods like those described by Tsai & Lens and Strobl and Hirzinger is that estimating the hand-eye calibration based only on calibration plate poses is suboptimal. This is because each computed camera-calibration plate pose is usually more precise in some directions than other directions, but that directional precision information is not contained in the camera-calibration plate poses. The fact that camera-calibration plate poses are usually more precise in some directions than other directions can be understood by considering that the calibration plate's orientation can usually be more precisely estimated than the calibration plate's tilt.

SUMMARY OF THE INVENTION

Illustrative embodiment of the present invention overcome the disadvantages of the prior art by providing a system and method for robust calibration between a machine vision system and a robot. Illustratively, the robot is moved to a plurality of poses and images are acquired of a calibration object, such as a calibration plate, that is affixed to an end effector of the robot and which contains features at accurately known positions. Alternatively, a calibration object is fixed in space and camera(s) are mounted on the robot, which is then moved to a plurality of poses at which images are acquired of the calibration object. The machine vision system is utilized to analyze the acquired images by measuring the positions of the features in the image. The specified robot poses and the measured image feature positions are utilized to determine the relationship between the machine vision system's coordinate system and the robot's coordinate system.

In an exemplary stationary camera environment, illustrative embodiment of the present invention illustratively imposes a constraint that there is a unique six degree of freedom transform (6DOF) between each camera and the robot base coordinate system and explicitly imposes a constraint that there is a unique 6DOF transform between the robot end effector and the calibration plate. It should be noted that in alternative embodiment of the present invention, a differing number of degrees of freedom may be utilized. As such, the description of 6DOF should be taken as exemplary only. Illustrative embodiments of the present invention illustratively enable the simultaneous calibration of a plurality of cameras to a robot in addition to individual camera calibration, thereby obviated a need for first calibrating cameras to a workspace of a robot and then calibrating the machine vision system to the robot.

Cameras may be either mounted in space with a field of view encompassing part of a workplace of a robot or may be mounted on an articulated arm and/or end effector of the robot. Cameras that are mounted in space may be referred to herein as stationary cameras, while cameras that are mounted on an articulated arm and/or end effector of a robot may be referred to herein as moving cameras. When one camera is mounted in stationary space, illustrative embodiment of the present invention compute two transforms: the transform between the robot coordinate system and the camera's coordinate system, and the transform between the pose of the calibration object and the pose fo the end effector. When multiple cameras are mounted stationary in space, illustrative embodiments of the present invention compute the transforms between the robot coordinate system and each of the camera's coordinate systems and the transform between the pose of the calibration object and the pose of the end effector. It should be noted that the terms calibration object and calibration plate may be used interchangeably herein. The camera's coordinate system is sometimes referred to as the pose of the camera. The pose of the calibration object is sometimes referred to as the calibration object's coordinate system. The canonical calibration plate's coordinate system when the one or more cameras were calibrated is sometimes referred to as the machine vision system's coordinate system. The machine vision system's coordinate system is sometimes referred to as the machine vision system's world coordinate system. The pose of the end effector is sometime's referred to as the end effector's coordinate system. The pose of the end effector with respect to the robot base is sometimes referred to as the robot pose. The robot's coordinate system is sometimes referred to as the robot base coordinate system. Note that the invention can handle the situation where different cameras can be calibrated with respect to different canonical calibration plate transforms. In other words, illustrative embodiments of the present invention can handle the situation where the one more cameras were calibrated with respect to different machine vision system coordinate systems. This is because the invention estimates the pose of each camera—and the invention does not necessarily enforce the constraint that the cameras remain in the same poses with respect to the machine vision system coordinate system.

When one camera is robot-mounted, two transforms are also calculated: the transform between the robot coordinate system and the calibration object and the transform between the camera pose and the pose of the end effector. When utilizing multiple robot-mounted (moving) cameras, the invention computes the transform between the robot coordinate system and the calibration object and the transforms between each camera's pose and the pose of the end effector.

Note that the machine vision system world coordinate system usually serves as a placeholder and the machine vision system world coordinate system usually has no intrinsic physical meaning. Consequently, for single stationary cameras, users can utilize the hand-eye calibration transforms computed by this invention to adjust the machine vision system's world coordinate system with respect to the robot coordinate system (while leaving the transform between the camera and the machine vision system's world coordinate system unchanged). Alternatively, for single stationary cameras, users can utilize the hand-eye calibration transforms computed by this invention to adjust the transform between the camera and the machine vision system's world coordinate system (while leaving the transform between the machine vision system's world coordinate system with respect to the robot coordinate system unchanged). Alternatively, for single moving cameras, users can utilize the hand-eye calibration transforms computed by this invention to adjust the machine vision system's world coordinate system with respect to the end effector coordinate system (while leaving the transform between the camera and the machine vision system's world coordinate system unchanged). Alternatively, for single moving cameras, users can utilize the hand-eye calibration transforms computed by this invention to adjust the transform between the camera and the machine vision system's world coordinate system (while leaving the transform between the machine vision system's world coordinate system with respect to the end effector coordinate system unchanged). Since the camera pose and the machine vision system's world coordinate system can be traded off in this manner, we sometimes refer to estimating for the machine vision world coordinate system to refer to estimating for the camera pose, and we sometimes refer to estimating the camera pose to estimating for the machine vision world coordinate system.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Illustrative embodiments of the present invention provide a system and method for accurately refining hand-eye calibration while illustratively imposing a constraint that there is a unique 6DOF (degree of freedom) transform between each camera and the end effector for the moving camera case or imposing that there is a unique 6DOF transform between each camera and the robot base for the stationary camera case. It should be noted that in alternative embodiment of the present invention, a differing number of degrees of freedom may be utilized. As such, the description of 6DOF should be taken as exemplary only. Further, illustrative embodiments of the present invention illustratively enforce a constraint that there is a unique 6DOF transform between the robot coordinate system and the calibration plate for the moving camera case. Alternatively, for the stationary camera case, illustrative embodiments of the present invention enforce a constraint that there is a unique 6DOF transform between the calibration plate coordinate system and the end effector coordinate system. Illustratively, the robot is moved to specified poses and images are acquired of a calibration object which contains features at accurately known physical positions. An illustrative embodiment of the invention involves accurate knowledge of the feature physical positions, alternative embodiments of the invention could use inaccurately known feature physical positions. The calibration object is not necessarily a planar object (with all of the features on the same plane). Alternatively, the calibration object could be a three-dimensional object such as a cube where features occur on multiple faces. Alternatively, the calibration object could be a three-dimensional box (with different side lengths) where features occur on multiple faces. Alternatively, the calibration object could be a disc where features occur on one or both sides. Alternatively, the calibration object could be a sphere with features. Alternatively, the calibration object could be a cylinder with features.

The machine vision system then analyzes the acquired images by measuring the positions of the features in the images and relates the specified robot poses with the measured image feature positions so as to determine the relationship between the machine vision system's coordinate system and the robot's coordinate system. Illustrative embodiments of the present invention illustratively use analysis which explicitly imposes the constraint that there is a unique 6DOF transform between each camera and the end effector and explicitly imposes the constraint that there is a unique 6DOF transform between the robot coordinate system and the calibration plate for moving camera case. Alternatively, for the stationary camera case, illustrative embodiments of the present invention illustratively use analysis which explicitly imposes the constraint that there is a unique 6DOF transform between each camera and the robot base and explicitly imposes the constraint that there is a unique 6DOF transform between the calibration plate coordinate system and the end effector coordinate system.

An illustrative embodiment of the present invention involves using a stationary calibration plate and a stationary robot, alternative embodiments of the invention could involve using non-stationary calibration plates and/or non-stationary robots, so that multiple 6DOF transforms would be employed. The term camera illustratively refers to a combination of a sensing element for measuring electromagnetic radiation and a lens for bending electromagnetic radiation. Examples of camera sensing elements include CCD sensors, CMOS sensors and support circuitry so as to form a two-dimensional representation of the illumination. Lenses are commonly used to focus electromagnetic radiation from a scene onto a camera's sensing element. Cameras are sometimes referred to as machine vision cameras. For hand-eye calibration, the camera and lens are usually rigidly affixed to each other so to maintain consistent observations.

One embodiment of the refinement technique involves considering the discrepancies between transforms by comparing the distances between points mapped by the transforms. One embodiment of the refinement technique involves considering all of the physical points, $p_i$, on the calibration plate, and considering the difference in physical space between those points mapped by both $AXB^{-1}$ and Z. Each physical point p, mapped by Z, the transform between the robot base and the calibration plate, corresponds to the physical location of $p_i$ in robot coordinates. In addition, each physical point $p_i$ mapped by $AXB^{-1}$ also corresponds to the physical location of $p_i$ in robot coordinates. The distance between two physical points is unique and well understood. Thereby, we can consider the total sum squared discrepancy of all of the points mapped by all of the transforms, $\Sigma(AXB^{-1} p_i\text{-}Z p_i)^2$ and this formulation is well defined and relies on measuring distances between 3D points and does not rely on estimating discrepancies between rigid transforms.

The embodiment which minimizes $\Sigma (AXB^{-1} p_i\text{-}Z p_i)^2$ suffers from the disadvantage that it relies on estimates of the calibration plate pose with respect to the camera, but such methods are suboptimal because the computed camera-calibration plate poses contain less information than the original feature data. Each computed camera-calibration plate pose is usually more precise in some directions than other directions, but that directional precision information is not contained in the camera-calibration plate poses. The fact that camera-calibration plate poses are usually more precise in some directions than other directions can be understood by considering that the calibration plate's orientation can usually be more precisely estimated than the calibration plate's tilt.

One noted drawback of methods like those described by Tsai and Lenz and Strobl and Hirzinger is that they are directed towards calibrating a single camera. Since these methods have no provision for simultaneously calibrating multiple cameras, each camera will be calibrated independently. The disadvantage of calibrating each camera independently is that each independent calibration can assume a different calibration plate pose—whereas it is known that the calibration plate pose is consistent for all cameras. Calibration accuracy is almost always improved by incorporating all relevant physical constraints.

Another noted drawback of Tsai and Lenz's method of considering relative motions is that the relative motions are based on temporally consecutive robot poses. Consequently, a different temporal ordering of the robot poses may induce a different hand-eye calibration. Illustratively, the present invention produces hand-eye calibration independent of ordering of robot poses.

An illustrative embodiment of this refinement technique estimates the hand eye calibration parameters directly from the observed image feature positions instead of relying on computed camera-calibration plate poses. In an illustrative embodiment of the refinement technique, the system estimates the projection of the 3D points onto the corresponding cameras and compares the estimated 2D positions with the measured 2D positions. In an alternative embodiment of the refinement technique, the 3D rays $r_i$ corresponding to feature positions in each camera $f_i$ are compared to the 3D positions of the corresponding transformed points on the calibration plate. Then, the contributions from these individual comparisons are collected and combined in a sum squared fashion in order to estimate the hand-eye calibration parameters which minimize the sum squared discrepancy. In a further alternative embodiment, the contributions from the individual comparisons can be weighted by their distances from their respective cameras so that the distances between the 3D rays and the corresponding 3D points approximate the image discrepancies.

There are two fundamental ways to mount machine vision cameras for Vision Guided Robotics. In a first illustrative embodiment, one or more machine vision cameras can be mounted in stationary positions, described below in reference to FIG. 1, so as to view the robot's workspace. In a second illustrative embodiment, one or more machine vision cameras can be attached to the articulated arm and/or the end effector (so that the one or more cameras move with the robot), described below in reference to FIG. 2. Note that both of these fundamental ways of mounting machine vision cameras require hand-eye calibration in order for the machine vision measurements to be optimally used by the robot.

A. Calibration Environments

Figure 1:
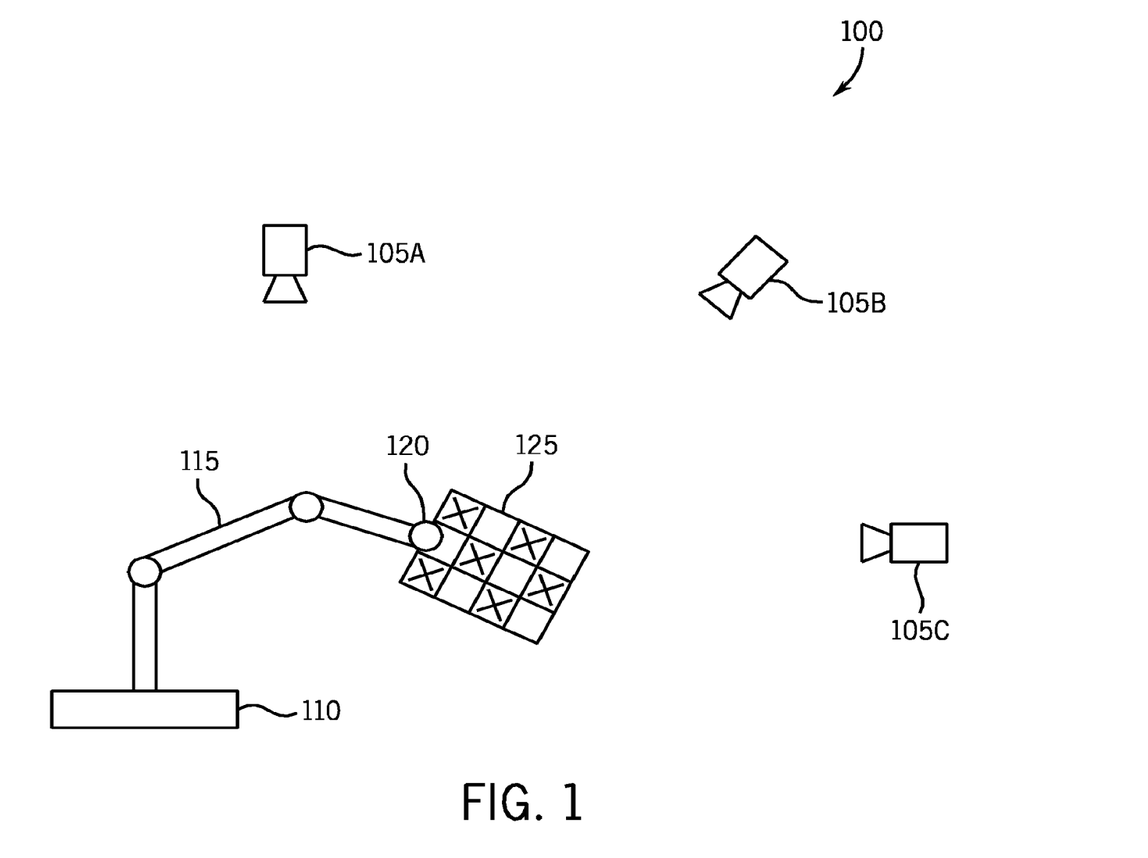
FIG. 1 is a schematic diagram of an exemplary machine vision robot environment with cameras mounted stationary in space for use with calibration between a machine vision system and a robot in accordance with an illustrative embodiment of the present invention.

FIG. 1 is a schematic diagram of an exemplary environment 100 having a robot with a calibration plate affixed to an end effector with a plurality of cameras mounted in space for use in performing a machine vision to robot calibration in accordance with an illustrative embodiment of the present invention. The environment 100 illustratively includes a plurality of cameras 105A, B, C which are fixed in space, each with a field of view of at least part of environment 100. Each of the cameras 105 obtains images of its field of view in its particular camera coordinate system. While three cameras 105A, B C are shown, the principles of the present invention may be utilized with any number of cameras. It should be noted that in alternative embodiments, differing numbers of cameras may be utilized. As such, the description of three cameras should be taken as exemplary only. The robot illustratively comprises a robot base 110 and an articulated arm 115 with an end effector 120 located at a terminal end. Illustratively, the robot base 110 is fixed within environment 100. In accordance with an illustrative embodiment of the present invention, the views of the cameras 105 are calibrated in terms of the robot base 110. That is, the robot base 110 serves as an origin for a robot coordinate system to be used in calibration. As will be appreciated by those skilled in the art, the robot can perform repeatable motions of its end effector to poses with respect to the robot base. Illustrative embodiments of the present invention enable robust calibration of a machine vision system to the robot base coordinate system.

The articulated arm 115 is illustratively shown to have three segments. However, it should be noted that in alternative embodiments, differing numbers of segments may be utilized. As such, the description of a three segment articulated arm 115 should be taken as exemplary only. There are many ways other than an articulated arm to position an end effector: alternative actuators for positioning an end effector include combinations of linear stages, Stuart platforms, etc. Further, the end effector 120 may comprise any type of end effector known in the art, e.g., mechanical, electromagnetic, vacuum suction, etc. In accordance with an illustrative embodiment of the present invention, the calibration plate 125 is affixed to the end effector 120. The calibration plate may comprise a conventional calibration plate typically used in machine vision systems. Exemplary calibration plates are sold by Cognex Corporation of Natick, Mass. An exemplary calibration plate is model no. 320-5029R available from Cognex Corporation. Alternative calibration plates and methods for measuring features are described in U.S. Pat. No. 6,137,893. Alternative calibration plates and methods for measuring features are described in U.S. Pat. No. 6,816, 187. Alternative calibration plates and measuring features are described in "A Versatile Camera Calibration Technique for High-Accuracy 3D Machine Vision Metrology Using Off-the-Shelf TV Cameras and Lenses" by Roger Y. Tsai, IEEE Journal of Robotics and Automation, Volume RA-3, No. 4, pages 323-344, the contents of which are hereby incorporated by reference.

However, it should be noted that in accordance with alternative embodiments of the present invention, differing types of calibration plates may be utilized. One example of a calibration plate could be a display screen displaying a calibration pattern. Another example of a calibration plate could be a display screen displaying a varying pattern—such that multiple images could be acquired of the display screen's different patterns—and the composition of results could be considered a single acquisition of a calibration plate. As such, the calibration plates described in the above-incorporated United States Patent Application should be taken as exemplary only. The calibration plate 125 is affixed to the end effector 120 in a manner to prevent slippage during movement of the end effector. As described further below, the articulated arm 115 and end effector 120 are moved to a plurality of poses within the fields of view of the cameras 105. It should be noted that the calibration plate can alternatively be attached anywhere on the actuator, rather than the end effector, although, in this alternative situation, the robot poses provided should correspond to the pose of the appropriate position on the actuator. Image data collected from the plurality of poses is then utilized in accordance with teachings of illustrative embodiments of the present invention to generate calibration transforms.

Figure 2:
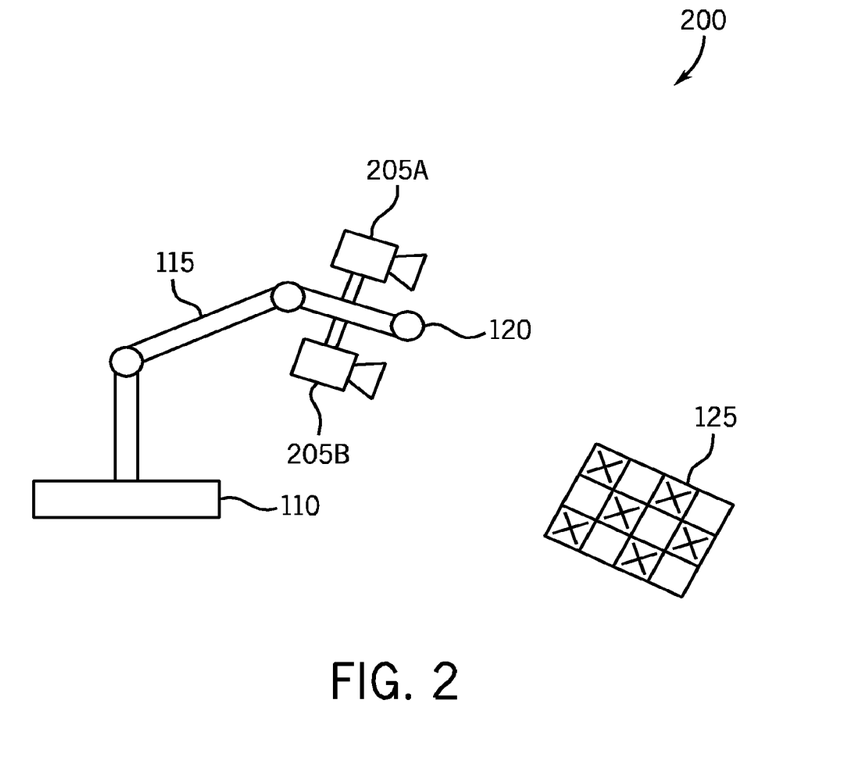
FIG. 2 is a schematic diagram of an exemplary machine vision robot environment with cameras mounted on the robot for use with calibration between a machine vision system and a robot in accordance with an illustrative embodiment of the present invention.

FIG. 2 is a schematic diagram of an exemplary environment 200 for machine vision robot calibration of which a plurality of cameras are affixed to the articulated arm of a robot in accordance with an illustrative embodiment of the present invention. A calibration plate 125 is fixed in environment 200. Illustratively, the calibration plate is fixed so that it may not be moved during the calibration procedure in accordance with an illustrative embodiment of the present invention. A robot base 110 is also fixed within the environment 200. An articulated arm 115 is connected to the robot base 110, and an end effector 120 is located at the terminal end of the articulated arm 115. Affixed to the end of the articulated arm 115 are a plurality of cameras 205A, B. The cameras 205 are illustratively affixed the articulated arm 115 and/or the end effector 120. The cameras 205 are rigidly fixed so that they may not be moved independent of the articulated arm 115 and/or the end effector 120. It should be noted that in accordance with the principles of illustrative embodiments of the present invention any number of cameras 205 may be utilized. As such, the description of two cameras 205A, B being utilized should be taken as exemplary only. As described further below in reference to FIG. 4, the articulated arm 115 and/or end effector 120 are moved to a variety of poses and images are acquired of the calibration plate 125.

It should be noted that in accordance with the principles of illustrative embodiments of the present invention, the cameras could alternatively be attached to any portion of the actuator, rather than the end effector, although, in this alternative situation, the robot poses provided should correspond to the pose of the appropriate position on the actuator. Furthermore, in this alternative situation, different cameras can be attached to different portions of the actuator. From the acquired images, calibration information may be obtained or calculated to enable a control system (not shown), described further below in reference to FIG. 5, to control the robot in terms of robot base coordinates.

B. Calibration Using Fixed (Stationary) Cameras

Illustratively, for hand-eye calibration for the case of one or more stationary cameras, a calibration object, such as a calibration plate, is rigidly affixed to either the articulated arm of the robot and/or the end effector, and the robot is moved to various poses such that the calibration object is viewed by one or more cameras. The acquired images of the calibration object are recorded in conjunction with the robot poses.

For the case of a single stationary camera, hand-eye calibration is illustratively performed by estimating two transforms: (1) the robot's coordinate system in terms of the machine vision system's world coordinate system, and (2) the transform between the pose of the calibration object and the pose of the end effector. It is assumed that the cameras are pre-calibrated for both extrinsic and intrinsic parameters, and that the camera calibration remains constant during and after the hand-eye calibration. Since camera calibration includes a transform between the pose of the camera and the machine vision system's world coordinate system, estimating the machine vision system's world coordinate system in essence estimates the pose of the camera since the camera pose is linked to the machine vision system's world coordinate system through the camera calibration transform which remains constant.

Note that the images acquired for hand-eye calibration could be used to calibrate the cameras (i.e., determine the extrinsic and intrinsic parameters), and in this way, the cameras would not need to be calibrated prior to hand-eye calibration as the hand-eye calibration procedure may illustratively include camera calibration as a first step.

Since the camera remains firmly in place and the robot base remains firmly in place during the hand-eye calibration procedure, both the robot's coordinate system should remain constant and the machine vision system's coordinate system should remain constant. Therefore, there should only be one transform between the robot's coordinate system and the machine vision system's coordinate system. Similarly, since the calibration object remains firmly affixed to the articulated arm and/or the end effector during the hand-eye calibration procedure, there should only be one transform relating the pose of the end effector to the pose of the calibration object.

The transform G maps from the robot's coordinate system to the machine vision system's coordinate system. The transform H maps from the calibration object to the end effector pose. Assume that the cameras have been calibrated such that the mapping P maps from 3D points in the machine vision system coordinates to 2D points in an acquired image. The camera calibration and the corresponding mapping P are assumed to remain constant throughout the hand-eye calibration procedure and afterwards. The transform Ri maps from the end effector pose (at step i) to the robot coordinate system. Let the term $x(i,u,v,w)$ refer to the x coordinate of the image feature position observed by an image feature extractor at step i corresponding to physical coordinates $(u,v,w)$ on the calibration object. Let the term $y(i,u,v,w)$ refer to the y coordinate of the image feature position observed by an image feature extractor at step i corresponding to physical coordinates $(u,v,w)$ on the calibration object. Therefore, $(x(i,u,v,w),y(i,u,v,w))$ is a 2D position of a found feature in an acquired image. This 2D position in an acquired image corresponds to the 3D position $(u,v,w)$ on the calibration object. The 3D position $(u,v,w)$ on the calibration object corresponds to the 3D position $H*(u,v,w)$ on the end effector. The 3D position $H*(u,v,w)$ on the end effector corresponds to the 3D position $Ri*H*(u,v,w)$ in the robot's coordinate system. The 3D position $Ri*H*(u,v,w)$ in the robot's coordinate system corresponds to the 3D position $G*Ri*H*(u,v,w)$ in the machine vision system's coordinate system. The 3D position $G*Ri*H*(u,v,w)$ corresponds to the 2D position $P(G*Ri*H*(u,v,w))$ in the acquired image. Each $(x(i,u,v,w),y(i,u,v,w))$ 2D position of a found feature in the acquired image corresponds to an expected 2D position $P(G*Ri*H*(u,v,w))$. For each found 2D feature position, the found 2D feature position can be compared with the expected 2D position to produce a discrepancy $P(G*Ri*H*$ (u,v,w))—(x(i,u,v,w),y(i,u,v,w)) in image coordinates. The sum of all of the squared discrepancies:

$$\Sigma |\, P(G*Ri*H*(u,v,w))-(x(i,u,v,w),y(i,u,v,w))|^2$$

is the combined discrepancy between the actual measured data and the expected data. In accordance with an illustrative embodiment of the present invention, the hand-eye calibration is refined by solving for the G and H parameters which induce the minimum sum squared residual between the actual measured data and the expected data. Note that H involves 6 degrees of freedom (6DOF) to parameterize the transform between the machine vision system's coordinate system and the robot coordinate system (3 degrees of freedom for translation and 3 degrees of freedom for rotation). Note that G involves 6 degrees of freedom (6DOF) to parameterize the transform between the calibration physical coordinate system defined by the calibration object and the end effector coordinate system (3 degrees of freedom for translation and 3 degrees of freedom for rotation). Let Ga,Gb,Gc,Gx,Gy,Gz refer to a 6-variable parameterization of G and let Ha,Hb,Hc,Hx,Hy,Hz refer to a 6-variable parameterization of H. Let E(Ga,Gb,Gc,Gx,Gy,Gz, Ha,Hb,Hc,Hx,Hy,Hz I measured image features positions and corresponding calibration positions and corresponding robot poses) refer to the sum squared error function which depends on the 12 variables Ga,Gb,Gc,Gx,Gy,Gz, Ha,Hb,Hc,Hx,Hy,Hz as well as the measured image features positions and corresponding calibration positions and corresponding robot poses. E can be numerically computed based by iteratively summing the individual contributions from I $P(G*Ri*H*(u,v,w))-(x(i,u,v,w),y(i,u,v,w))|^2$.

In an illustrative embodiment, the hand-eye calibration parameters are first coarsely estimated using a variant of the Tsai and Lenz method. The technique described in Daniilidis "Hand Eye Calibration Using Dual Quaternions," which was published in the International journal of Robotics Research, Volume 18, No. 3, pages 286-298, the contents of which are hereby incorporated by reference, is illustratively utilized to coarsely estimate the hand-eye calibration parameters. In alternative embodiments, the user could manually input coarse estimates of the hand-eye calibration parameters. In other alternative embodiments, a computer program could enumerate multiple coarse estimates of hand-eye calibration parameters and refine each of these enumerated coarse estimates and select the refined hand-eye calibration parameters which induce the lowest residual.

Illustratively, illustrative embodiments of the present invention refine the parameter values by using gradient descent techniques to find the parameter values which minimize E. The parameterizations of the 3D rotations of G and H make use of the coarse estimates of the transforms corresponding to the hand-eye calibration. Quaternions are a well-known efficient method of parameterizing the space of 3D rotations, but quaternions suffer from the fact that they involve 4 parameters: s0,s1,s2,s3. Fortunately, quaternions are defined in terms of projective coordinate system such that scaling all 4 values r*s0,r*s1,r*s2,r*s3 do not affect the 3d rotation. Consequently, a 1-variable-fixed coordinate representation can be defined where one of the four quaternion values is fixed at 1 or −1 and the other three quaternion coordinates correspond to the 3 parameters. This parameterization is valid because the approximate 3D rotation is known from the coarse estimate and therefore which quaternion coordinate to fix as 1 or −1 can be suitably chosen.

In particular, the Levenberg-Marquadt optimization technique is illustratively utilized to perform gradient descent to find the global minimum by using the fact that the partial derivatives of the error function will be 0 at a local extremum, and that the Levenberg-Marquadt technique numerically solves for a simultaneous solution to a system of equations, which in this case, is the set of partial derivatives: dE/dGa, dE/dGb, dE/dGc, dE/dGx, dE/dGy, dE/dGz, dE/dHa, dE/dHb, dE/dHc, dE/dHx, dE/dHy, dE/dHz. Note that since E( ) is a function of Ga,Gb,Gc,Gx,Gy,Gz, Ha,Hb,Hc,Hx,Hy,Hz, all of its partial derivatives may be functions of Ga,Gb,Gc,Gx,Gy,Gz, Ha,Hb,Hc,Hx,Hy,Hz.

In order to use the Levenberg-Marquadt technique, partial derivatives of E need to be computed at arbitrary parameter values. Let the term vector J refer to an arbitrary selection of parameter values. The first order partial derivatives of E can be numerically estimated with respect to each of the independent variables by computing the difference between E computed at configuration J and E computed at a nearby configurations which are symmetrical around configuration J which only differ slightly in one of the variables, and then dividing by the difference between the variable values at the symmetrical configurations. For example, the partial derivative of E with respect to Gc can be computed at configuration J by computing the ratio between the difference in E values and the difference in the variable, $(E(Ga_j,Gb_j,Gc_j+\delta, Gx_j,Gy_j,Gz_j, Ha_j,Hb_j,Hc_j,Hx_j,Hy_j,Hz_j)-E(Ga_j,Gb_j,Gc_j-\delta, Gx_j,Gy_j,Gz_j, Ha_j,Hb_j,Hc_j,Hx_j,Hy_j,Hz_j))\,/(2\delta)$. Illustratively, a value of $10^{-4}$ for $\delta$ is utilized, although other embodiments could use different values for $\delta$. In an alternative embodiment, the partial derivatives of E with respect to a variable could be computed at configuration J by using asymmetric sample configurations, such as computing the ratio between the difference in E values and the difference in the variable, $(E(Ga_j,Gb_j,Gc_j+\delta, Gx_j,Gy_j,Gz_j, Ha_j,Hb_j,Hc_j, Hx_j,Hy_j,Hz_j)-E(Ga_j,Gb_j,Gc_j,Gx_j,Gy_j,Gz_j, Ha_j,Hb_j,Hc_j,Hx_j, Hy_j,Hz_j))/\delta$.

An alternative embodiment could analytically compute the partial derivatives of E with respect to the variables by setting up an analytical expression for the error function E, and then computing the symbolic derivative. The symbolically computed derivative could be more accurate than the numerically computed derivative—and would also not require the user to choose a step size for computing a numerical derivative. First a generic algebraic error function is formulated characterizing the error between one 2D image feature position and the corresponding 3D calibration feature position and the robot pose as a multivariate algebraic expression of unknown parameters.

Internally, the Levenberg-Marquadt optimization method involves the partial derivatives of the system of equations to be optimized. The system of equations are partial derivatives of an error function, so that the partial derivatives that the Levenberg-Marquadt technique uses are second order partial derivatives of the E function. The second order partial derivatives can be numerically estimated with respect to two variables by numerically computing the ratio between the difference in dE/dvar partial derivatives (separated by a small amount in one of the variables) and that small amount: For example, the second order partial derivative of E with respect to Gc with respect to Gc can be computed at configuration J by computing $(dE/dvar\ (Ga_j,Gb_j,Gc_j+\varepsilon Gx_j, Gy_j,Gz_j, Ha_j,Hb_j,Hc_j,Hx_j,Hy_j,Hz_j)-dE/dvar\ (Ga_j,Gb_j,Gc_j, Gx_j,Gy_j,Gz_j, Ha_j,Hb_j,Hc_j,Hx_j,Hy_j,Hz_j))/\varepsilon$. In an illustrative embodiment, a maximum of 100 iterations are utilized, a value of $10^{-4}$ for $\varepsilon$ and a value of $10^{-2}$ for lambda and a value of $10^{-6}$ for $\delta$ for the Levenberg-Marquadt optimization. The variable lambda is commonly used to refer to the damping factor for Levenberg-Marquadt methods.

Note that this hand-eye calibration method explicitly imposes the constraint that there is a unique 6DOF transform between each camera and the end effector and while enforcing the constraint that there is a unique 6DOF transform between the robot coordinate system and the physical coordinate system defined by the calibration object. This is because this hand-eye calibration method parameterizes the 6DOF transform between each camera and the end effector and the 6DOF transform between the robot coordinate system and the calibration plate. Since these constraints accurately reflect the actual physical system, imposing these constraints in the hand-eye calibration method yields more accurate hand-eye calibration models than hand-eye calibration methods which do not impose these constraints.

Another aspect of embodiments of the present invention involves simultaneously calibrating for the pose of multiple cameras and the pose of the calibration object which respect to the end effector. In this aspect of the invention, each camera's pose is separately parameterized using 6 parameters for each camera. Thereby, the overall system for hand-eye calibrating n cameras involves 6*n+6 parameters, among which 6*n parameters are for the n cameras, and 6 parameters are for the pose of the calibration object with respect to the end effector. Hand-eye calibration can be performed on multiple cameras by considering a different machine vision coordinate system for each camera. This is reasonable because a specific camera calibration is assumed for each camera, and a slightly different pose of the machine vision coordinate system equates to a slightly different pose of each camera than was specified by that camera's camera calibration. Furthermore, this approach of characterizing a different machine vision coordinate system for each camera is easily incorporated into the framework for refining the hand-eye calibration. As compared to the 12 parameters Ga,Gb,Gc,Gx,Gy,Gz, Ha,Hb,Hc,Hx,Hy,Hz used to characterize hand-eye calibration for a single camera, hand-eye calibration uses 6*(n+1) parameters G1a,G1b,G1c,G1x, G1y,G1z, G2a,G2b,G2c,G2x,G2y,G2z, . . . Gna,Gnb,Gnc, Gnx,Gny,Gnz, Ha,Hb,Hc,Hx,Hy,Hz to characterize hand-eye calibration.

In order to perform hand-eye calibration on a system with multiple cameras let (xk(i,u,v,w),yk(i,u,v,w)) be a 2D position of a found feature in an acquired image corresponding to camera k. This 2D position in an acquired image corresponds to the 3D position (u,v,w) on the calibration object. The 3D position (u,v,w) on the calibration object corresponds to the 3D position H*(u,v,w) on the end effector. The 3D position H*(u,v,w) on the end effector corresponds to the 3D position Ri*H*(u,v,w) in the robot's coordinate system. The 3D position Ri*H*(u,v,w) in the robot's coordinate system corresponds to the 3D position Gk*Ri*H*(u,v,w) in camera k's machine vision system's coordinate system. The 3D position Gk*Ri*H*(u,v,w) corresponds to the 2D position Pk(Gk*Ri*H*(u,v,w)) in camera k's acquired image. Each (xk(i,u,v,w),yk(i,u,v,w)) is a 2D position of a found feature in the acquired image corresponds to an expected 2D position Pk(Gk*Ri*H*(u,v,w)). For each found 2D feature position, the found 2D feature position can be compared with the expected 2D position to produce a discrepancy Pk(Gk*Ri*H*(u,v,w))—(xk(i,u,v,w),yk(i,u,v,w)). The square of this discrepancy is |Pk(Gk*Ri*H*(u,v,w))—(xk(i, u,v,w),yk(i,u,v,w))|$^2$. The sum of all of these squared discrepancies is $\Sigma$|Pk(Gk*Ri*H*(u,v,w))—(xk(i,u,v,w),yk(i,u, v,w))|$^2$ In an illustrative embodiment the acquisition of images and positioning of the calibration object is arranged so that the calibration object pose which defines the machine vision coordinate system will be used to acquire one of the images for hand-eye calibration. Illustratively, this is achieved by using the images acquired for the hand-eye calibration as the images for camera calibration where one of the images used for hand-eye calibration is the image used to define the machine vision coordinate system for camera calibration. Alternately, this is achieved by acquiring the images for the hand-eye calibration first, and then, while leaving the calibration object in the same pose, and using the first acquired image for camera calibration as the image for defining the machine vision coordinate system.

Figure 3:
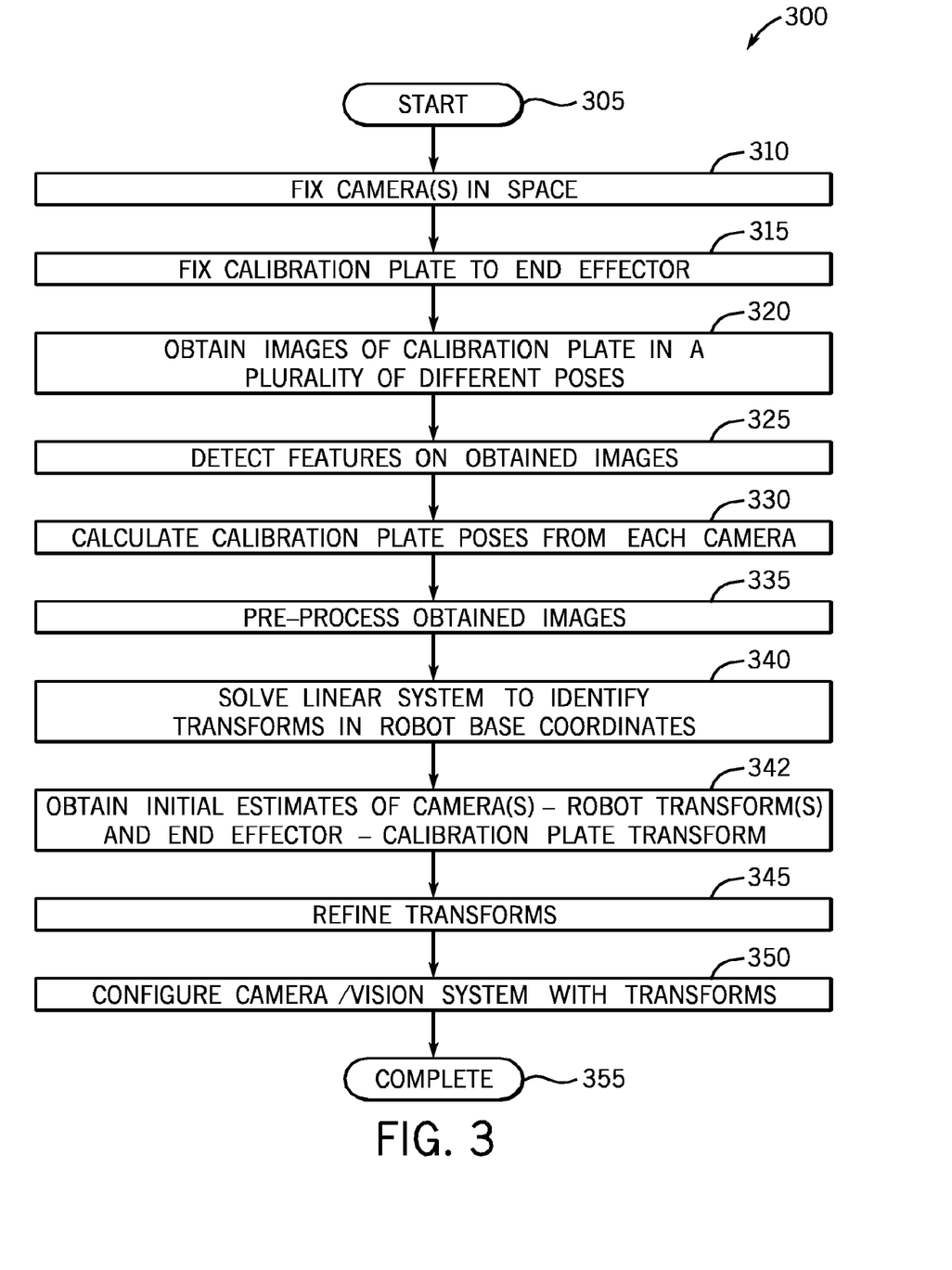
FIG. 3 is a flow chart detailing the steps of a procedure for performing calibration between a robot and a machine vision system utilizing fixed cameras in accordance with an illustrative embodiment of the present invention.

FIG. 3 is a flow chart detailing the steps of an exemplary procedure 300 for performing a machine vision to robot calibration utilizing fixed cameras in accordance with an illustrative embodiment of the present invention. The procedure 300 begins in step 305 and continues to step 310 where one or more cameras are fixed in space. As noted above, illustrative embodiments of the present invention can simultaneously calibrate a plurality of cameras. Illustratively, the cameras that will be utilized for calibration are fixed in the environment in which they will be utilized in a manner that makes it improbable that they will move. The calibration plate is fixed to the end effector of the articulated arm in step 315. In alternative embodiments, the calibration plate may be affixed to one of the segments of the articulated arm instead of the end effector. As such, the description of the calibration plate being fixed to the end effector should be taken as exemplary only.

The end effector is then moved to a plurality of poses and images are obtained of the calibration plate in each of the plurality of poses in step 320. Illustratively, the motion among those poses includes rotations around at least two non-parallel axes. Further, to obtain better calibration information, the angle of rotation should be at least 5°. This is not a firm requirement; however, improved results may be obtained with larger rotations or movements between various poses.

An image feature extraction technique is then performed on the obtained images to extract features on the calibration plate in step 325. Illustratively, the feature extraction step utilizes techniques such as those sold by Cognex Corporation as its feature detector. Alternative methods for measuring features are described in U.S. Pat. No. 6,137,893. Alternative methods for measuring features are described in U.S. Pat. No. 6,816,187. Alternative methods for measuring features are described in "A Versatile Camera Calibration Technique for High-Accuracy 3D Machine Vision Metrology Using Off-the-Shelf TV Cameras and Lenses" by Roger Y. Tsai, IEEE Journal of Robotics and Automation, Volume RA-3, No. 4, pages 323-344. However, it should be noted that in alternative embodiments, differing feature extraction techniques may be utilized. As such, the description of utilizing techniques described in the above-incorporated United States Patents should be taken as exemplary only. Furthermore, in alternative embodiments of the present invention, the feature extraction may utilize differing techniques including, e.g., the use of three-dimensional features from a three-dimensional camera, a range camera, a combination of structured illumination and a camera working together to provide three-dimensional information, thermal feature detection using heat sensitive cameras, etc. For example, a stereo camera system may be utilized in which two or more cameras view the calibration plate and measure the 3D positions of each feature.

Alternatively, a single sensing element used in conjunction with multiple distinct optical paths, such as non-uniform lenses, mirrors, or holographic lens elements could be considered to be multiple individual cameras. Alternatively, multiple sensing elements sharing the same optical path could be considered to be a single camera As such, the description of feature detection using conventional machine vision systems should be taken as exemplary only.

For each of the cameras, calibration plate poses (the poses of the calibration plate with respect to each camera) are then calculated in step 330. That is, by utilizing a set of intrinsic data and correspondences between known feature locations and observed feature locations, the pose of the camera is calculated with respect to the calibration plate. This step assumes that the cameras' intrinsic parameters have been pre-calibrated. However, an alternative embodiments, the cameras may be calibrated using the collected data, thereby obviated a two step process of first calibrating the cameras and then performing the calibration between the machine vision system and the robot. Camera calibration may be performed using such well-known techniques as those described in U.S. Pat. No. 6,816,187. Alternatively, camera calibration may be performed by the technique described in "A Versatile Camera Calibration Technique for High-Accuracy 3D Machine Vision Metrology Using Off-the-Shelf TV Cameras and Lenses" by Roger Y. Tsai, IEEE Journal of Robotics and Automation, Volume RA-3, No. 4, pages 323-344. It should be noted that in alternative embodiments of the present invention, differing forms of camera calibration may be utilized. As such, the description of the camera calibration utilizing the above-incorporated United States Patent Application should be taken as exemplary only.

The obtained images along with their corresponding robot poses are then pre-processed in step 335. This pre-processing illustratively documents the motions for the plate and the robot. Each pair of image and robot pose are then reordered to maximize motions. With each plate poses calculated in step 330 with the pre-calibrated camera parameters, the motion between each two plate poses is calculated. Similarly, the motion between two robot poses is calculated. All pairwise of plate motions and robot motions are then calculated and those pairs whose discrepancies are off by a predetermined threshold are illustratively deemed to be outliers and are removed from the motion pairs.

For a pair of robot motion and calibration plate motion, if representing their rotations using an equivalent rotation around a single axis or representing the motions using screw motion, the rotation angles should be equal in ideal situation. Therefore, the difference of rotation angles between robot motion and calibration plate motion from the same pair can be used as the discrepancy. The reordering enables the system to derive consistent motions from poses with arbitrary order, and use motions with substantial rotations, which results in more stable, accurate, and robust calibration determinations.

The calibration system then solves the linear system to identify transforms in robot base coordinates in step 340. As described above, this illustratively utilizes a variant to the Tsai and Lenz technique. It should be noted that steps 330-340 may be optional in alternative embodiments of the present invention.

In an alternative embodiment, initial estimates of the camera(s)-robot transform(s) and the end effector-calibration place transform are obtained in step 342. The transforms are then refined in step 345. The refinement is based on minimizing the sum of all of the squared discrepancies between the expected 2D image feature positions and the found feature positions mentioned above. Alternatively, the initial estimation for the transform from the end effector to the calibration plate and the transform from each camera to the robot base system can be refined first by an independent refinement which minimizes the discrepancies among the reported robot poses and calculated robot poses using the transforms. Then the refined transforms can be fed to the 2D feature position discrepancy based refinement. Alternatively, a check step can be added after the refinement to ignore the refined results if the refined results do not provide better results than the unrefined results with respect to a specified checking metric.

The transforms consistency refinement (minimize the discrepancies among the reported robot poses and the calculated robot poses using the transforms) also refines for multiple cameras simultaneously, i.e. for multiple fixed cameras, there is only one transform from the calibration plate coordinate to the robot end effector's coordinate system.

An example of transform consistency refinement is as follows:

Let Z represent the the transform from the camera coordinate system to the robot base coordinate system. Let X represent the the transform from the calibration plate system to the robot's end effector's coordinate system. Bi is the robot pose (transform from the robot's end effector's coordinate system to the robot base coordinate system) at station i. Ai is the calibrate plate pose (the transform from the calibration plate coordinate system to the camera coordinate system) for one camera at station i. The transform Ai is sometimes referred to as the measured transform. The composition $Z\_inverse*Bi*X$ is sometimes referred to as the predicted transform. The following composition should be an identity transform (since it transforms from the calibration plate coordinate system to the calibration plate coordinate system).

$Ai\_inverse*Z\_inverse*Bi*X$

The goal of refinement is to minimize the overall discrepancy between each $Ai\_inverse*Z\_inverse*Bi*X$ and identity transform for all cameras and movements.

In hand-eye calibration application, an illustrative way of computing the difference between two transforms (or two poses) is based on using the working space dimension as follows. Assume that the working volume of the robot-vision application can be represented by a bounding box, then difference between transform X1 and transform X2 can be measured by comparing the positions of the eight mapped vertices of the bounding box: v1 to v8:

$$\Sigma(X1*vi - X2*vi)\ i=1\text{-}8$$

An illustrative step is to use the refined transforms from transforms consistency refinement and feed it into the image feature based refinement. It provides much better initial estimates and can speed up the convergence of the refinement based on using the image features, and avoid becoming trapped in local minima.

One example of a checking metric is be the root mean square (rms) discrepancy in image coordinates computed after refinement, as compared to the root mean square (rms) discrepancy before refinement. In some cases, the robot motions may not be as accurate as the vision system, and the refinement might overfit the camera-end effector transform and the robot base-calibration plate transform based on the inaccurate robot poses. By comparing the residuals before and after refinement, we can determine whether we want to accept the results from refinement.

Another method for determining whether the refinement was an improvement is to compare the root mean square (rms) discrepancy in image coordinates computed after refinement with the root mean square (rms) discrepancy in image coordinates of the camera calibration. By comparing the residuals after refinement with the residuals associated with camera calibration, we can determine whether we want to accept the results from refinement.

The cameras/machine vision system is then configured with the transforms in step 350. The cameras/machine vision system configuration enables to the system to report locations viewed by the machine vision system in terms of the robot base coordinate system. The procedure 300 then completes in step 355.

C. Calibration Using Moving (Robot-Mounted) Cameras

In an illustrative embodiment, the camera(s) are affixed to the articulated arm so as to be transformed in accordance with the end effector. A calibration object is positioned so as to be viewed by the cameras, and the robot arm/end effector is moved to various poses such that the calibration object is viewed by one or more cameras. The acquired images of the calibration object are recorded in conjunction with the robot poses.

Similar to the hand-eye calibration method for a single stationary camera, hand-eye calibration for a single moving camera is performed by computing two transforms: (1) the transform between the robot's coordinate system and the physical coordinate system defined by the calibration object, and (2) the transform between the camera's machine vision coordinate system and the pose of the end effector. Since the robot base and the calibration object remain stationary during the hand-eye calibration procedure, there should only be one transform between the robot's coordinate system and the calibration object. Similarly, since the camera remains firmly positioned with respect to the end effector during the hand-eye calibration procedure, there should only be one transform relating the pose of the end effector to the pose of the camera.

Again, similar to the hand-eye calibration method for stationary camera(s), hand-eye calibration for moving camera(s) can perform camera calibration using all of the hand-eye calibration images, so that the cameras are not required to be precalibrated prior to hand-eye calibration. The transform G maps from the robot's coordinate system to the calibration object's coordinate system. The transform G^-1 maps from the calibration object's coordinate system to the robot's coordinate system. The transform H maps from the camera's machine vision coordinate system to the end effector pose. The transform H^-1 maps from the end effector pose to the camera's machine vision coordinate system. Assume that the cameras have been calibrated such that the mapping P maps from 3D points in machine vision system coordinates to 2D points in an acquired image. It is assumed that the camera calibration (intrinsic and extrinsic parameters) and the corresponding mapping P remain constant throughout the hand-eye calibration procedure and afterwards. Let the term Ri refer to transform which maps from the end effector pose (at step i) to the robot coordinate system. Let the term Ri^-1 refer to transform which maps from the robot coordinate system (at step i) to the end effector pose (at step i). Let the term x(i,u,v,w) refer to the x coordinate of the image feature position at step i corresponding to physical coordinates (u,v,w) on the calibration object. Let the term y(i,u,v,w) refer to the y coordinate of the image feature position at step i corresponding to physical coordinates (u,v,w) on the calibration object. Each (x(i,u,v,w),y(i,u,v,w)) is a 2D position of a found feature in an acquired image. This 2D position in an acquired image corresponds to the 3D position (u,v,w) on the calibration object. The 3D position (u,v,w) on the calibration object corresponds to the 3D position G^-1*(u,v,w) in the robot coordinate system. The 3D position G^-1*(u,v,w) in the robot coordinate system corresponds to the 3D position Ri^-1*G^-1*(u,v,w) in the end effector's coordinate system. The 3D position Ri^-1*G^-1*(u,v,w) in the end effector's coordinate system corresponds to the 3D position H^-1*Ri^-1*G^-1* (u,v,w) in the camera's machine vision system's coordinate system. The 3D position H^-1*Ri^-1*G^-1* (u,v,w) corresponds to the 2D position P(H^-1*Ri^-1*G^-1*(u,v,w)) in the acquired image. Each (x(i,u,v,w),y(i,u,v,w)) 2D position of a found feature in the acquired image corresponds to an expected 2D position P(H^-1*Ri^-1*G^-1*(u,v,w)). For each found 2D feature position, the found 2D feature position is compared with the expected 2D position to produce a discrepancy P(H^-1*Ri^-1*G^-1(u,v,w))—(x(i,u,v,w),y(i,u,v,w)). The square of the distance of this discrepancy is |P(H^-1*Ri^-1*G^-1(u,v,w))—(x(i,u,v,w),y(i,u,v,w))|². The sum of all of these squared discrepancies is Σ|P(H^-1*Ri^-1*G^-1*(u,v,w))—(x(i,u,v,w),y(i,u,v,w))|² and corresponds to the combined discrepancy between the actual measured data and the expected data in image coordinates. Illustratively, the hand-eye calibration is computed by solving for the G and H parameters which induce the minimum sum squared residual between the actual measured data and the expected data. The parameter values are solved for G and H that minimize the sum squared residual between the actual measured data and the expected data.

The hand-eye calibration method for moving cameras, i.e., cameras that are mounted on the robot, is similar to the hand-eye calibration method for stationary cameras. Like the hand-eye calibration method for a single stationary camera, the hand-eye calibration method for a single mounted camera also parameterizes the system in terms of 12 variables: Ga,Gb,Gc,Gx,Gy,Gz, Ha,Hb,Hc,Hx,Hy,Hz, and first computes a coarse estimate of the hand-eye calibration, and then uses optimization methods such as gradient descent to refine the parameter estimates. Like the hand-eye calibration method for a single stationary camera, the hand-eye calibration method for a single moving camera also computes an error function E(Ga,Gb,Gc,Gx,Gy,Gz, Ha,Hb, Hc,Hx,Hy,Hz) which characterizes the sum squared discrepancy between the actual measured feature positions and the predicted feature positions, and refines the parameters using optimization methods such as gradient descent. Like the hand-eye calibration method for a single stationary camera, an illustrative embodiment for the hand-eye calibration method for a single moving camera also uses Levenberg-Marquadt on the system of partial derivatives of the error function where those partial derivatives are computed numerically.

Like the hand-eye calibration method for multiple stationary cameras, the illustrative embodiment for the hand-eye calibration method for multiple moving cameras also handles multiple cameras by associating a different machine vision system coordinate system with each camera and by using 6n+6 parameters to characterize the hand-eye calibration (although in this case, there is one G transform and n H transforms) Ga,Gb,Gc,Gx,Gy,Gz , H1a,H1b,H1c,H1x,H1y, H1z, H2a,H2b,H2c,H2x,H2y,H2z, . . . Hna,Hnb,Hnc,Hnx, Hny,Hnz, to characterize hand-eye calibration.

Like the hand-eye calibration method for multiple stationary cameras, the illustrative embodiment for the hand-eye calibration method for multiple moving cameras also lets (xk(i,u,v,w),yk(i,u,v,w)) refer to a 2D position of a found feature in an acquired image for camera k. This 2D position in an acquired image corresponds to the 3D position (u,v,w) on the calibration object. The 3D position (u,v,w) on the calibration object corresponds to the 3D position $G\hat{}-1*(u,v,w)$ in the robot coordinate system. The 3D position $G\hat{}-1*(u,v,w)$ in the robot coordinate system corresponds to the 3D position $Ri\hat{}-1*G\hat{}-1*(u,v,w)$ in the end effector's coordinate system. The 3D position $Ri\hat{}-1*G\hat{}-1*(u,v,w)$ in the end effector's coordinate system corresponds to the 3D position $Hk\hat{}-1*Ri\hat{}-1*G\hat{}-1*(u,v,w)$ in the camera k's machine vision system's coordinate system. The 3D position $Hk\hat{}-1*Ri\hat{}-1*G\hat{}-1*(u,v,w)$ corresponds to the 2D position $Pk(Hk\hat{}-1*Ri\hat{}-1*G\hat{}-1*(u,v,w))$ in camera k's acquired image. Each $(xk(i,u,v,w),yk(i,u,v,w))$ 2D position of a found feature in the acquired image corresponds to an expected 2D position $Pk(Hk\hat{}-1*Ri\hat{}-1*G\hat{}-1*(u,v,w))$. For each found 2D feature position, the found 2D feature position is compared with the expected 2D position to produce a discrepancy $Pk(Hk\hat{}-1*Ri\hat{}-1*G\hat{}-1*(u,v,w))-(xk(i,u,v,w),yk(i,u,v,w))$ in image coordinates. The square of the distance of this discrepancy is $|Pk(Hk\hat{}-1*Ri\hat{}-1*G\hat{}-1*(u,v,w))-(xk(i,u,v,w),yk(i,u,v,w))|^2$. The sum of all of these squared discrepancies is $\Sigma|kP(Hk\hat{}-1*Ri\hat{}-1*G\hat{}-1*(u,v,w))-(xk(i,u,v,w),yk(i,u,v,w))|^2$ and corresponds to the combined discrepancy between the actual measured data and the expected data. The hand-eye calibration is illustratively computed by solving for the G and H1 . . . Hn parameters which induce the minimum sum squared residual between the actual measured data and the expected data. The parameter values are solved for G and H1 . . . Hn that minimize the sum squared residual between the actual measured data and the expected data.

Figure 4:
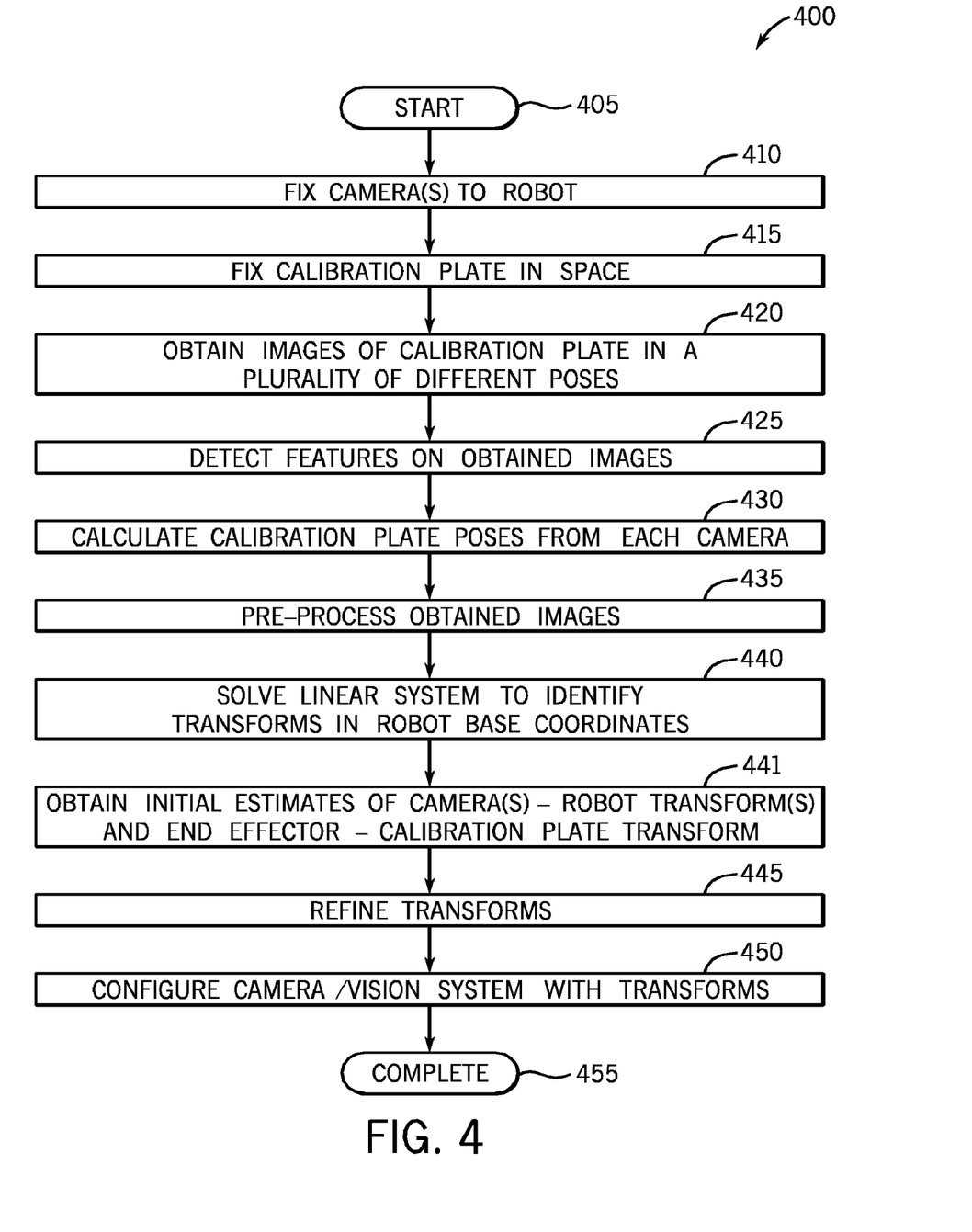
FIG. 4 is a flow chart detailing the steps of a procedure for performing calibration between a robot and a machine vision system utilizing cameras mounted on the robot in accordance with an illustrative embodiment of the present invention.

FIG. 4 is a flow chart detailing the steps of an exemplary procedure 400 for performing a machine vision to robot calibration utilizing cameras affixed to the robot in accordance with an illustrative embodiment of the present invention. The procedure 400 begins in step 405 and continues to step 410 where one or more cameras are fixed to the robot. As noted above, an illustrative embodiment of the present invention can simultaneously calibrate a plurality of cameras. Illustratively, the cameras that will be utilized for calibration are fixed to either an articulated arm and/or the end effector of the robot. The calibration plate is fixed in space in step 415. Illustratively, the calibration plate is fixed so that it will not move during the calibration process. The end effector is then moved to a plurality of poses and images are obtained of the calibration plate in each of the plurality of poses in step 420. Illustratively, the movements among all poses include rotations around at least two non-parallel axes. To obtain better calibration information, when the angle of rotation should be at least 5°. This is not a firm requirement; however, improved results may be obtained with larger rotations among movements.

An image detection technique is performed on the obtained images to detect features on the calibration plate in step 425. As described above, the feature detection may utilize techniques such as techniques such as those sold by Cognex Corporation as its feature detector. Alternative methods for measuring features are described in U.S. Pat. No. 6,137,893. Alternative methods for measuring features are described in U.S. Pat. No. 6,816,187. Alternative methods for measuring features are described in "A Versatile Camera Calibration Technique for High-Accuracy 3D Machine Vision Metrology Using Off-the-Shelf TV Cameras and Lenses" by Roger Y. Tsai, IEEE Journal of Robotics and Automation, Volume RA-3, No. 4, pages 323-344. Furthermore, as noted above, in alternative embodiments of the present invention, the feature extraction may utilize differing techniques including, e.g., the use of three-dimensional features from a three-dimensional camera, thermal feature detection using heat sensitive cameras, etc.

For each of the cameras, calibration plate poses are then calculated in step 430. That is, by utilizing a set of intrinsic data and correspondence between known feature locations and observed feature location, the pose of the camera is calculated with respect to the calibration plate. This step assumes that the cameras have been pre-calibrated. However, an alternative embodiments, the cameras may be calibrated using the collected data, thereby obviated a two step process of first calibrating the cameras and then performing the calibration between the head machine vision system and the robot. The obtained images and their corresponding robot poses are then pre-processed in step 435. This pre-processing illustratively documents the motion for each plate and the robot. Each pair of image and robot pose are then reordered to maximize motions. With each camera pose calculated in step 430 with the pre-calibrated camera parameters, the motion between each two camera poses is calculated. Similarly, the motion between two robot poses is calculated. All pairwise camera motions and robot motions are calculated and those pairs whose discrepancies are off by a predetermined threshold are deemed to be outliers and are removed from the motion pair.

For a pair of robot motion and camera motion, if representing their rotations using an equivalent rotation around a single axis or representing the motions using screw motion, the rotation angles should be equal in ideal situation. Therefore, the difference of rotation angles between robot motion and camera motion from the same pair can be used as the discrepancy.

The reordering enables the system to derive consistent motions from poses with arbitrary order, and use motions with substantial rotations, which results in more stable, accurate, and robust calibration determinations..

It should be noted that in alternative embodiments, steps 430-440 may be optional. The calibration system then solves the linear system to compute transforms in robot base coordinates in step 440. In an alternative embodiment, in step 442, initial estimates of camera(s)-robot transform(s) and end effector-calibration plate transform are obtained. The transforms are then refined in step 445. The refinement is based on minimizing the sum of all of the squared discrepancies between the expected 2D image feature positions and the found feature positions mentioned above. Alternatively, the initial estimation for the transform from the end effector to the camera and the transform from the plate to the robot base system can be refined first by an independent refinement which minimizes the discrepancies among the reported robot poses and calculated robot poses using the transforms. Then the refined transforms can be fed to the 2D feature position discrepancy based refinement. Alternatively, a check step can be added after the refinement to ignore the refined results if the refined results do not provide better results than the unrefined results with respect to a checking metric.

The transforms consistency refinement (minimize the discrepancies among the reported robot poses and the calculated robot poses using the transforms) simultaneously refines the positions for multiple cameras . In other words for the multiple moving camera case, there is only one transform from the calibration plate coordinate system to the robot base coordinate system.

An example of transform consistency refinement is as follows. Let Z refer to the transform from calibration plate coordinate to robot base coordinate, X is the transform from the camera coordinate system to the robot's end effector's coordinate system. Bi is the robot pose (transform from robot's end effector's coordinate system to the robot base coordinate system) at station i. Ai is the calibrate plate pose (transform from calibration plate coordinate system to the camera coordinate system) for one camera at station i. The transform Ai is sometimes referred to as the measured transform. The following composition should be the identity transform (because is the composition of transforms from the calibration plate coordinate system to the calibration plate coordinate system).

Z_inverse*Bi*X*Ai

The goal of refinement is to minimize the overall discrepancy between each Z_inverse*Bi*X*Ai and identity transform for all cameras and movements. The composition (Z_inverse*Bi*X)_inverse is sometimes referred to as the predicted transform.

In hand-eye calibration application, an illustrative way of computing the difference between two transforms (or two poses) is based on using the working space dimension as follows. Assume that the working volume of the robot-vision application can be represented by a bounding box , then the difference between transform X1 and transform X2 can be computed by considering the distance between points mapped by the transforms—in particular, the 8 vertices of the bounding box: v1 to v8:

$$\Sigma\ (X1*vi - X2*vi)\ i=1\text{-}8$$

An illustrative step is to refine the camera-end effector transform and the robot base-calibration plate transform before further refining these transforms using the image feature based refinement. Initially refining the transforms by using the metric of the discrepancies between the mapped points provides much better initial estimates for the image feature based refinement, and can speed up the hand-eye calibration and make it more robust as well.

One example of a checking metric is be the root mean square (rms) discrepancy in image coordinates computed after refinement, as compared to the root mean square (rms) discrepancy before refinement. In some cases, the robot motions may not be as accurate as the vision system, and the refinement might overfit the camera-end effector transform and the robot base-calibration plate transform based on the inaccurate robot poses. By comparing the residuals before and after refinement, we can determine whether we want to accept the results from refinement..

Another method for determining whether the refinement was an improvement is to compare the root mean square (rms) discrepancy in image coordinates computed after refinement with the root mean square (rms) discrepancy in image coordinates of the camera calibration. By comparing the residuals after refinement with the residuals associated with camera calibration, we can determine whether we want to accept the results from refinement.

The cameras/machine vision system is then configured with the transforms in step 450. The procedure 400 then completes in step 455.

D. Control Mechanisms

Figure 5:
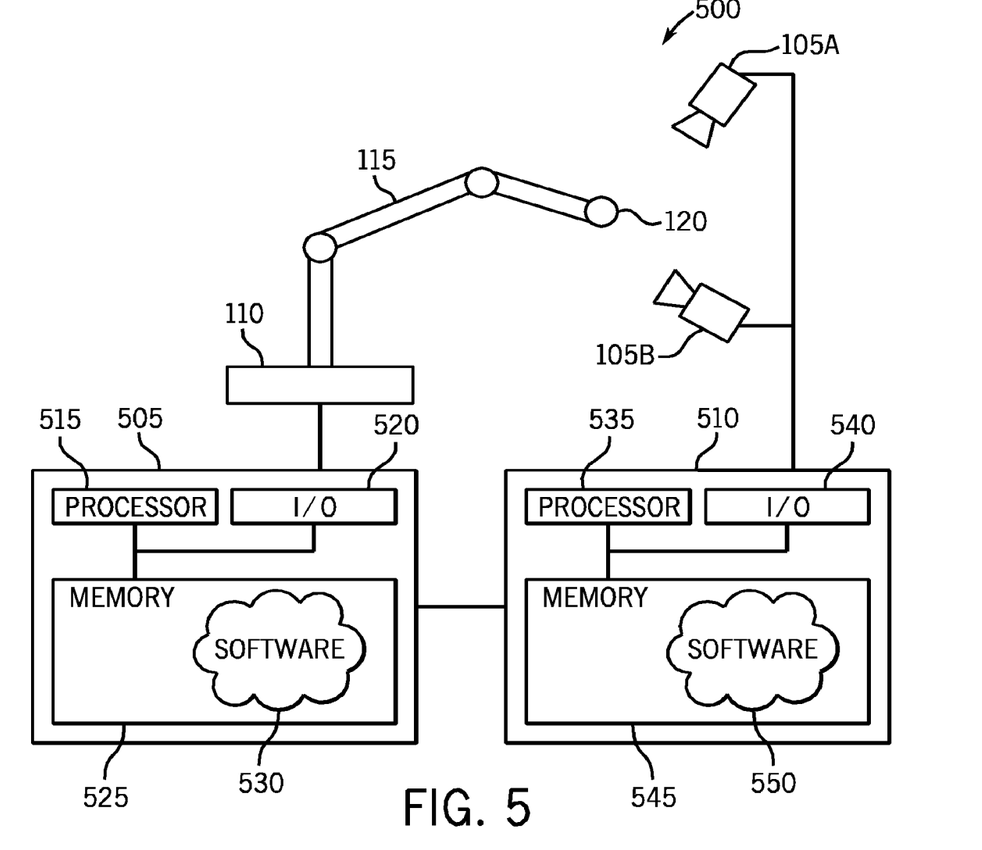
FIG. 5 is a schematic block diagram of exemplary control systems for machine vision system and a robot in accordance with an illustrative embodiment of the present invention.

FIG. 5 is a schematic block diagram of an exemplary environment 500 illustrating control mechanisms for a machine vision system and a robot in accordance with an illustrative embodiment of the present invention. A robot base 110 is operatively interconnected with an articulated arm 115 having an end effector 120 on its terminal end. Illustratively, the robot is operatively interconnected with a robot control system 505. Illustratively, the robot control system 500 comprises a processor 515, a set of input/output adapters 520 and a memory 525. Stored within memory 525 is software 530 for controlling the robot control system 505 and robot. Illustratively, the robot control system 505 may be implanted in a different formats including, e.g., the use of programmable read only memory (PROM), nonvolatile random access memory (NVRAM), etc. As such, the description of the components of the robot control system 505 should be taken as exemplary only. Furthermore, it should be noted that in alternative embodiments, the robot control system 505 may be hard wired with no software, etc.

Also included within environment 500 are cameras 105A, B. It should be noted that in environment 500, the cameras 105 are shown as being fixed in space; however, an alternative embodiments, the cameras may be mounted to the articulated arm 115 and/or the end effector 120 of the robot. As such, the description of the cameras 105 being fixed in space should be taken as exemplary only. The cameras 105 are operatively interconnected with a machine vision system 510. The machine vision system 510 illustratively includes a processor 535, input/output adapters 540 and a memory 545. The memory 545 illustratively includes software 550 implements the novel calibration technique in accordance with an illustrative embodiment of the present invention. Again, as noted above in reference to robot control system 505, the machine vision system 510 may comprise alternative or may comprise additional and/or differing components. As such, the description contained herein should be taken as exemplary only.

The foregoing has been a detailed description of illustrative embodiments of the present invention. Various modifications in editions can be made without departing from the spirit and scope of the invention. Additionally, while this description is been written in terms of software executed on hardware, it is expressly contemplated the teachings of his invention can be implemented as software, including a computer-readable medium having program instructions and executing on a computer, hardware, firmware, or a combination thereof. Accordingly, this description should be taken only by way of example and not otherwise limit the scope of the invention.

The invention claimed is:

1. A method for calibration between a machine vision system and a robot, the method comprising:
    obtaining a set of pairs of camera poses and robot poses;
    analyzing corresponding robot motions of the robot and camera motions of a camera among the obtained set of pairs;
    detecting outliers based on the analyzing;
    re-ordering the set of pairs, with the detected outliers removed, to obtain a set of pairs of camera poses and robot poses with suitable motions;
    utilizing the set of pairs of camera poses and robot poses with suitable motions to perform calibration by obtaining a plurality of images of a calibration object in at least two pairs of camera poses and robot poses and minimizing discrepancies between features of the calibration object identified in the plurality of images and features of the calibration object predicted by the robot poses in the set of pairs of camera poses and robot poses using a camera coordinate system for the camera, a calibration object coordinate system for the calibration object, a robot coordinate system for a portion of the robot that is stationary, and an effector coordinate system for a portion of the robot that moves to occupy the robot poses.

2. The method of claim 1 wherein suitable motions comprises rotation of at least five degrees.

3. The method of claim 1 wherein suitable motions comprises rotation along at least two non-parallel axes.

4. The method of claim 1 wherein the set of pairs comprises at least three pairs of camera poses and robot poses.

5. The method of claim 1 wherein the calibration object comprises a calibration plate.

6. The method of claim 1 wherein the suitable motions comprises changes between a particular pair of a reduced set of obtained images.

7. The method of claim 1 wherein the camera is affixed to an articulated arm of the robot.

8. The method of claim 1 wherein the camera is fixed in space and in view of the robot.

9. The method of claim 1 wherein the calibration object is affixed to an end effector of the robot.

10. The method of claim 1 wherein the calibration object is fixed in space.

11. The method of claim 1 wherein each outlier in the obtained set of pairs is detected based on a threshold discrepancy between the robot motion and camera motion corresponding to the outlier.

12. The method of claim 1 wherein the machine vision system comprises multiple cameras for obtaining the plurality of images.

13. The method of claim 1 wherein the calibration object comprises a first object feature and a second object feature, the first object feature and the second object feature located at a fixed, known distance relative to one another.

\* \* \* \* \*